United States Patent [19]

Biella

[11] Patent Number: 5,532,701

[45] Date of Patent: Jul. 2, 1996

[54] ARRANGEMENT FOR COMPARING TWO TEMPORALLY SEPARATED BURSTS OF SIGNAL AT TWO DIFFERENT FREQUENCIES

[75] Inventor: Daniele Biella, Milan, Italy

[73] Assignee: Alcatel Italia S.p.A., Milan, Italy

[21] Appl. No.: 65,591

[22] Filed: May 21, 1993

[30] Foreign Application Priority Data

May 21, 1992 [IT]  Italy .................................. MI92A1230

[51] Int. Cl.⁶ ...................................................... G01S 1/04
[52] U.S. Cl. ............................ 342/387; 342/47; 342/413; 342/410; 364/451
[58] Field of Search ............................. 342/47, 408, 410, 342/411, 413, 387, 389; 364/451, 460; 324/76.41, 76.44, 76.45

[56] References Cited

U.S. PATENT DOCUMENTS

| | | | |
|---|---|---|---|
| 3,321,760 | 9/1963 | Lipsey | 342/389 |
| 4,333,081 | 6/1982 | Höfgen | 342/407 |
| 4,455,556 | 6/1984 | Koshio et al. | 342/47 |
| 4,646,097 | 2/1987 | King | 342/95 |
| 4,860,014 | 8/1989 | Shores et al. | 342/105 |
| 5,163,004 | 11/1992 | Rentz | 364/460 |
| 5,339,082 | 8/1994 | Norsworthy | 342/90 |

*Primary Examiner*—Thomas H. Tarcza
*Assistant Examiner*—Dao Phan
*Attorney, Agent, or Firm*—Frishauf, Holtz, Goodman, Langer & Chick

[57] ABSTRACT

A comparator circuit compares two temporally separated input bursts of signals which occur at two different frequencies. The first burst is an interrogation pulse and the second burst is a reply pulse in a DME system. The comparator circuit includes a first frequency converter (CO1) for receiving at an input thereof the two input bursts, and a comparing device (DC) connected to receive an output of the first frequency converter (CO1). In order to reduce the measurement errors, the first frequency converter (CO1) receives at the input thereof the two input bursts and converts them into two new bursts of signals that have a common frequency so that the comparing device (DC) can carry out the comparison at the common frequency.

18 Claims, 1 Drawing Sheet

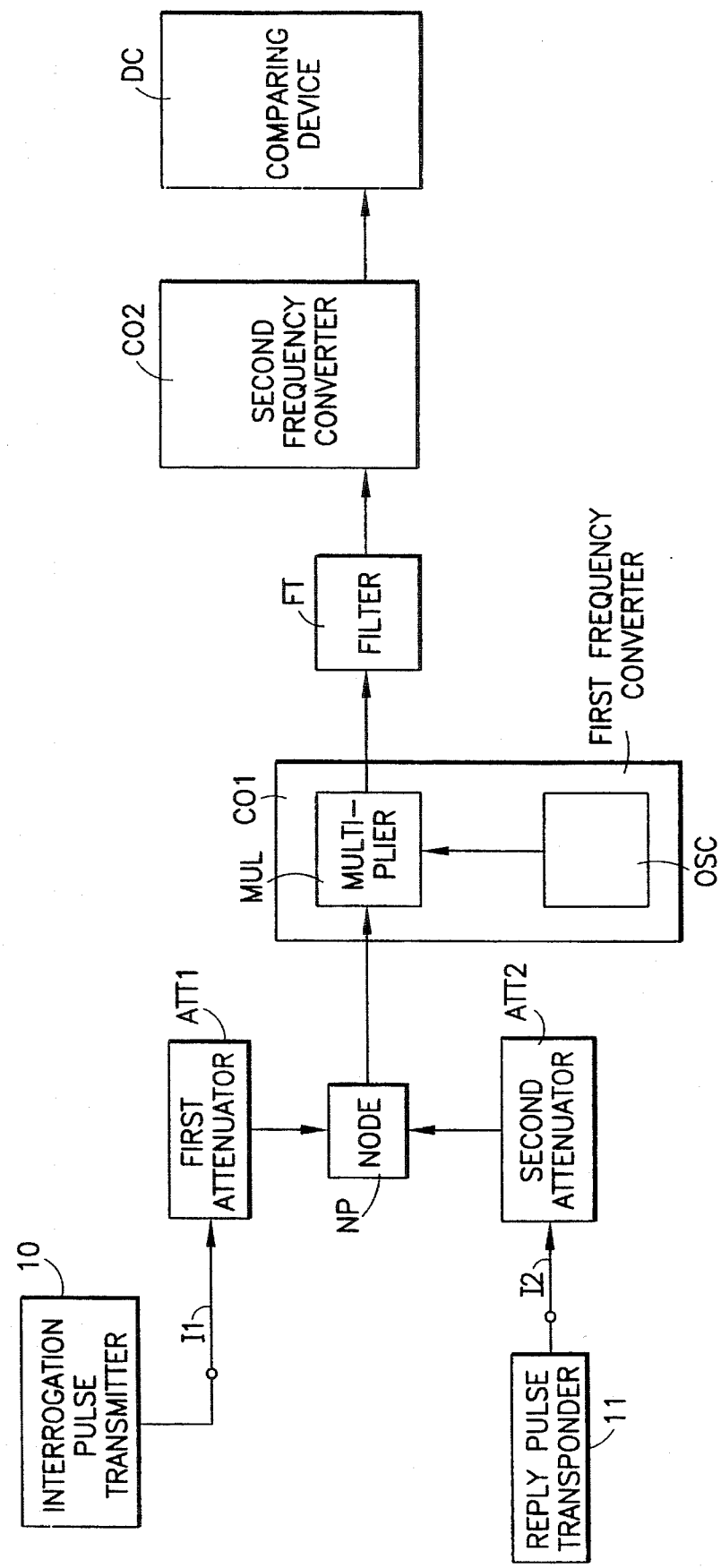

ARRANGEMENT FOR COMPARING TWO TEMPORALLY SEPARATED BURSTS OF SIGNAL AT TWO DIFFERENT FREQUENCIES

BACKGROUND OF THE INVENTION

1. Field of the Invention

The present invention relates to an arrangement for comparing two temporally separated bursts of signal at two different frequencies in particular an interrogation pulse and a reply pulse in a DME (Distance Measuring Equipment) system for aid to navigation.

2. Description of the Prior Art

DME systems, both of the DME/N type (used in the ILS (Instrument Landing System)) and of DME/P type (used in the MLS (Microwave Landing System) navaid systems), provide the aircraft with distance information by measuring total round-trip time between a transmission of an interrogation signal from an airborne transmitter and a receipt of a reply signal from a ground transponder.

From a strictly theoretical point of view, and therefore by not taking into account air traffic and morphology of the particular ground are where the DME system really operates, it is sufficient that the transmitter only sends a so-called interrogation pulse and the transponder, after receiving the interrogation pulse, transmits in turn only a so-called reply pulse.

Since the transponder takes a certain time to reply, it has been established by standardization authorities in the field of air navigation that the reply pulse is transmitted by the transponder with a fixed and pre-established delay with respect to the instant in which the interrogation pulse is received. The airborne equipment, therefore, takes into account such fixed and pre-established delay for the correct evaluation of distance.

Hence, during manufacturing and installation, there is the problem of being able to calibrate the transponder so that it provides such pre-established delay with precision.

Both of the above-mentioned pulses (i.e., the interrogation and reply pulses) are transmitted by modulating the amplitude of two carriers at two different frequencies which are both about 1 GHz, and are spaced apart exactly 63 MHz from each other; the pulses have the same form and the same duration (i.e., about 3 microseconds); the fixed and pre-established delay is about 50 microseconds; the precision with which such delay must be observed by the transponder is a few nanoseconds.

An obvious solution consists in providing at the input of an oscilloscope both pulses in such a way as to display them and then proceed with the measurement; but an oscilloscope having the characteristics necessary for allowing such measurement with the parameters set forth above is extremely expensive.

As a result in the prior art, it is common practice to place before the oscilloscope, a simple envelope detector, in such a way that the band necessary for the oscilloscope is a few MHz. For the envelope detector, a known diode and capacitor configuration is used in such a way that distortion introduced by said detector is limited as much as possible.

However, such a solution introduces comparatively large errors, with respect to the strict requirements, due to diode offset and above all due to the fact that both the measuring system and the envelope detector operate at two different frequencies and therefore they introduce different delays for the two (interrogation and reply) pulses.

SUMMARY OF THE INVENTION

It is an object of the present invention to provide a measurement system which is not very expensive and which allows the test and calibration of a DME systems, particularly of the ground transponder, according to the strict requirements imposed upon them.

This object is attained through an arrangement for comparing two temporally separated bursts of signals at two different frequencies, converting the two bursts into two new bursts at the same frequency and a comparator for comparing the two new bursts with each other.

Through the conversion of the two bursts of signals, which are at two different frequencies, into two new bursts at the same frequency using the same frequency converter, a significant reduction in the measurement error is obtained.

Such a solution is therefore suitable to be applied to the most general case, with respect to test and calibration of a DME systems. This generalized solution compares two temporally separated bursts of signals that are at two different frequencies. In fact, the present invention is independent of the characteristics of the two signal bursts and is also independent of the type of comparison to be carried out.

When used in DME systems such a solution may be built into a Built-In Test Equipments (BITE) contained in such systems.

BRIEF DESCRIPTION OF THE DRAWING

The invention will be now illustrated in more detail with reference to the attached drawing which shows a schematic block diagram of the arrangement in accordance with the present invention.

DETAILED DESCRIPTION

In the following, "signal burst" means an electric signal limited in time, comprising both unmodulated signals and signal amplitudes, and frequency or phase modulated signals.

The arrangement mainly comprises a comparing device DC and a first frequency converter (CO1).

Two temporally separated bursts of signal which occur at two different frequencies, (which are to be compared), are provided at the input of the first frequency converter CO1 which converts them into two new bursts of signals that are at the same frequency which is generally different from zero.

The output of the first convertor CO1 is provided to the input of the comparing device DC which allows an exact comparison between the two bursts.

Since the two bursts are provided at the same input of the first converter CO1, both will be subjected to practically identical amplitude distortion and delays. Also, the frequency conversion can be realized through circuits that have a regular response, (at least much more regular than an envelope detector). Moreover, errors due to the operation of the comparing device DC will be significantly reduced because the comparing device DC operates at the same frequency for the two new bursts.

The output of the first converter CO1 can be advantageously provided to the input of a second converter CO2 which is designed to convert the two new bursts of signal at the same frequency into bursts at a lower frequency, e.g., zero.

Naturally, in the second instance, the output of the second converter CO2 is provided at the input of the comparing device DC.

In order to improve the features of the arrangement and therefore the accuracy of the comparison it is convenient that the amplitudes of the two signal bursts are made to be comparable or, still better, equal to each other.

Such a result is obtainable by placing upstream of the first converter CO1 a first attenuator ATT 1, a second attenuator ATT 2 and a pick-up node NP; the first attenuator ATT 1 is provided with an input I1 to which one of the two bursts of signals is applied, the second attenuator ATT 2 is provided with an input I2 to which the other of the two bursts of signals is applied. The pick-up node NP is provided with two inputs that are electrically connected to receive the respective outputs of the two attenuators ATT 1 and ATT 2. An output of node NP is electrically connected to the input of the first frequency converter CO1; the attenuation factors of attenuators ATT 1 and ATT 2 must be chosen in a suitable way in relation to the power of the two bursts of signal respectively at the inputs I1 and I2.

The choice of circuitry for such devices basically depend on the frequency band at which each one operates. For DME systems, attenuators ATT 1 and ATT 2 can be realized by use of common RF attenuators, while pick-up node NP comprises an electrical connection of its two inputs and by a non-directional coupler at the output thereof. The transmitter of the aircraft 10 and the ground transponder 11 are respectively connected to be the inputs of attenuators ATT 1 and ATT 2. The interrogation pulse generated by the transmitter, is transmitted to reach the transponder and is input of the transponder 11 and a reply pulse reaches is transmitted by the transponder 116 of the transmitter 10. The reply pulse is also provided to the first converter CO1; the transponder 11 in turn generates afterwards the reply pulse that reaches the first converter CO1. For a more accurate measurement, it is necessary to take into account the reply pulse propagation time between the transponder and the pick-up node NP.

A particularly advantageous choice for implementation of CO1 of the present invention is a frequency equal to half the difference between the two different frequencies of the two bursts of signals; this is obtainable by including an oscillator OSC and a multiplier MUL in the first converter CO1. Oscillator OSC generates a periodic electrical signal having a frequency equal to the average value of the two different frequencies; multiplier MUL receives at its input the two bursts of signal and multiplies them, at different times, by a periodic electric signal received from oscillator OSC. Such periodic electrical signal can be advantageously a sine wave or a square wave.

At the output of the first converter CO1, i.e., at the output of the multiplier MUL, it is advisable to place a filter FT in such a way as to eliminate the spurious spectra derived from the product. According to the circumstances multiplier MUL will be a low-pass or band-pass filter; the choice of the cut-off frequency of filter FT is made with typical criteria used in telecommunications.

The second converter CO2 can reduce the frequency of both bursts at any frequency: more exactly, CO2 translates the spectrum of such bursts in such a way that its central frequency is less than the input central frequency, the central frequency at the output of CO2 is often chosen to be equal to zero. In some circumstances, a simple diode and capacitor envelope detector can be used in second frequency converter CO2.

The use of a spectrum analyzer as a second converter CO2 is a practical solution that is very advantageous. To do this, the analyzer must be set in the so-called SPAN ZERO mode, i.e., that operation mode of the spectrum analyzer in which the channel filter is held fast so that it does not sweep the spectrum. The output of the spectrum analyzer is picked up in order to send it to the comparing device DC. In such a way the spectrum analyzer operates like a precision envelope detector.

The comparing device DC can be an oscilloscope, e.g., a storage oscilloscope can be used when the comparison is carried out by an engineer through image observation. The operating signal band required for such an oscilloscope depends on the band of the two bursts and on the frequency reduction provided in particular by the second converter CO2. When the frequency reduction of the oscilloscope band is to be particularly limited, for example, in DME systems, the oscilloscope base is about 5 MHz. Should the amplitudes of the two bursts be very unequal, it is convenient to use an oscilloscope with a contemporaneous double time base and with separately variable sensitivities in such a way as to be able to execute a graphic overlapping of the two bursts.

In the special case of DME systems, the comparison to be executed includes the measurement of an elapsed time between said two bursts: although an oscilloscope, as such could be used, an advantageous alternative is to use a time meter triggered, in a known manner, by the respective starts of the two bursts.

Various changes and modifications may be made, and features described in connection with the embodiment may be used with any of the others, within the scope of the inventive concept.

I claim:

1. An arrangement for comparing two timewise separated input bursts of signals that occur at two different frequencies, for use in navigation systems, comprising:

a first frequency converter, connected to receive at an input thereof, both of said two separated input bursts of signals, for converting said two separated input bursts of signals into two new bursts of signals that have a common frequency; and a comparator connected to receive said two new bursts of signals from said first frequency converter, for comparing a characteristic of said two new bursts of signals with each other, whereby measurement errors in the arrangement are reduced by said comparator comparing said two new bursts of signals at said common frequency.

2. The arrangement according to claim 1, further comprising:

a second frequency converter connected to receive said two new bursts of signals at an input thereof, for converting said two new bursts of signals into two lower frequency bursts of signals, said second frequency converter being positioned between said first frequency converter and said comparator.

3. The arrangement according to claim 1, further comprising:

a pick-up node connected between a first and a second attenuator, said two separated input bursts of signals being respectively supplied to said first and second attenuators; and said pick-up node feeding said two separated input bursts of signals to said first frequency converter such that respective amplitudes of said two separated input bursts of signals at said input of said first frequency converter are comparable with each other.

4. The arrangement according to claim 1, wherein said common frequency is equal to half of a difference in frequency between said two different frequencies of said two separated input bursts of signals.

5. The arrangement according to claim 1, wherein said first frequency converter produces at an output thereof, a first frequency converter output signal that is a product of said two separated input bursts of signals multiplied by a periodic signal having a frequency equal to an average value of said two different frequencies of said two separated input bursts of signals; and a filter connected to receive said first frequency converter output signal for eliminating spurious spectra from said first frequency converter output signal.

6. The arrangement according to claim 5, wherein said periodic signal is a sine wave.

7. The arrangement according to claim 1, wherein said comparator includes an oscilloscope.

8. The arrangement according to claim 1, wherein said comparator comprises a time meter for measuring an elapsed time between said two separated input bursts of signals.

9. The arrangement according to claim 2, wherein said second frequency converter comprises an envelope detector.

10. The arrangement according to claim 2, wherein said second frequency converter includes a spectrum analyzer that operates in a SPAN ZERO mode, whereby said spectrum analyzer operates as a precision envelope detector.

11. An arrangement for comparing two separated input bursts of signals that occur at two different frequencies, for use in navigation systems, comprising:

a first frequency converter, connected to receive at an input thereof, both of said two separated input bursts of signals, for converting said two separated input bursts of signals into two new bursts of signals that have a common frequency;

a comparator connected to receive said two new bursts of signals from said first frequency converter, for comparing a characteristic of said two new bursts of signals with each other, whereby measurement errors in the arrangement are reduced by said comparator comparing said two new bursts of signals at said common frequency;

a pick-up node connected between a first and a second attenuator, said two separated input bursts of signals being respectively supplied to said first and second attenuators; and said pick-up node feeding said two separated input bursts of signals to said first frequency converter such that respective amplitudes of said two separated input bursts of signals at said input of said first frequency converter are comparable with each other;

and wherein:

said first attenuator is connected to receive a first one of said two separated input bursts of signals from a transmitter of a navigation system;

said first one of said two separated input bursts of signals comprises an interrogation signal generated in said navigation system; and said second attenuator is connected to receive a second one of said two separated input bursts of signals from a transponder, said second one of said two separated input bursts of signals being a reply signal generated in said navigation system in response to said interrogation signal.

12. The arrangement according to claim 11, wherein said navigation system comprises a DME system.

13. The arrangement according to claim 11, wherein said navigation system comprises an instrument loading system.

14. The arrangement according to claim 11, wherein said navigation system comprises a microwave landing system.

15. The arrangement according to claim 11, wherein said common frequency is different from both of said two different frequencies.

16. The arrangement according to claim 11, wherein said comparator measures an elapsed time between said two separated input bursts of signals.

17. The arrangement according to claim 1, wherein said common frequency is different from both of said two different frequencies.

18. The arrangement according to claim 1, wherein said comparator measures an elapsed time between said two separated input bursts of signals.

* * * * *

UNITED STATES PATENT AND TRADEMARK OFFICE
CERTIFICATE OF CORRECTION

PATENT NO. : 5,532,701
DATED : July 2, 1996
INVENTOR(S) : BIELLA, Daniele

It is certified that error appears in the above-indentified patent and that said Letters Patent is hereby corrected as shown below:

Title page, Item [56] References Cited, beneath "5,339,082" insert:

--FOREIGN PATENT DOCUMENTS 2 052 911  1/1981  United Kingdom

OTHER PUBLICATIONS

ELECTRICAL COMMUNICATION, Vol. 58, No. 3, 1984, BRUSSELS BE pages 336-343, K. BECKER et al, "PRECISION DISTANCE MEASURING EQUIPMENT FOR THE MICROWAVE LANDING SYSTEM".

NEC RESEARCH AND DEVELOPMENT No. 90, July 1988, TOKYO JP, pages 106-116, XP46941, KOBAYASHI ET AL, 'PRECISION DISTANCE MEASURING EQUIPMENT (DME/P) TRANSPONDER".--

Signed and Sealed this

First Day of July, 1997

*Attest:*

BRUCE LEHMAN

*Attesting Officer*    *Commissioner of Patents and Trademarks*